United States Patent [19]
Galloway et al.

[11] Patent Number: 4,831,793
[45] Date of Patent: May 23, 1989

[54] GREENHOUSE

[75] Inventors: W. Rut Galloway, P.O. Box 256, Easley, S.C. 29840; Gary A. Johnson, Greenville, S.C.

[73] Assignee: W. Rut Galloway, Easley, S.C.

[21] Appl. No.: 733,100

[22] Filed: May 13, 1985

[51] Int. Cl.⁴ .............................................. E04B 1/32
[52] U.S. Cl. ........................................... 52/86; 47/17
[58] Field of Search ..................... 52/86, 202; 47/17

[56] References Cited
U.S. PATENT DOCUMENTS

| | | | |
|---|---|---|---|
| 3,608,252 | 9/1971 | Bisson | 52/86 X |
| 3,961,442 | 6/1976 | Carter | 47/17 |
| 4,055,030 | 10/1977 | Earnshaw | 47/17 X |
| 4,091,584 | 5/1978 | Brown | 47/17 X |
| 4,381,629 | 5/1983 | Ahn | 47/17 X |
| 4,423,574 | 1/1984 | Pierre | 52/202 |

Primary Examiner—Carl D. Friedman
Assistant Examiner—Creighton Smith
Attorney, Agent, or Firm—Bailey & Hardaway

[57] ABSTRACT

A novel greenhouse or storage structure of simplistic design permitting controlled insulation and solar exposure.

7 Claims, 2 Drawing Sheets

GREENHOUSE

BACKGROUND OF THE INVENTION

This invention relates generally to the art of greenhouses, and more particularly to a novel greenhouse structure.

In the field of greenhouses, a variety of structures have existed from the initial all glass structures to the combination of masonry and glass and to a simple structure of polymeric film extended about supports.

In all of these structures, various problems have existed such as expense, control of ultraviolet exposure and degradation of film material due to such exposure.

A need thus exists for improved greenhouse structures.

SUMMARY OF THE INVENTION

It is thus a object of this invention to provide a novel greenhouse structure.

It is a further object of this invention to provide such a novel greenhouse structure which possesses simplicity in the number of elements utilized in this construction.

It is a further and more particular object of this invention to provide such a structure which permits control of solar exposure.

It is a still further and more particular object of this invention to provide such a structure which provides for controlled insulation.

These, as well as other objects, are accomplished by a structure having components defining a skeletal structure, a flexible covering over the exterior of the skeletal structure, skeletal structure being formed of structural components which define with the flexible covering receptacles for the selective placement and removal of insulating panels.

DETAILED DESCRIPTION

In accordance with this invention it has been found that a building structure which provides for a minimum of building elements and wherein those elements define receptacles for removable insulation, provides for an inexpensive structure which yet permits control of solar exposure as well as control of the insulation between the interior and exterior of the structure. Various other objects and advantages will become apparent from a reading of the following description with reference to the various figures of drawing.

Figure 1:
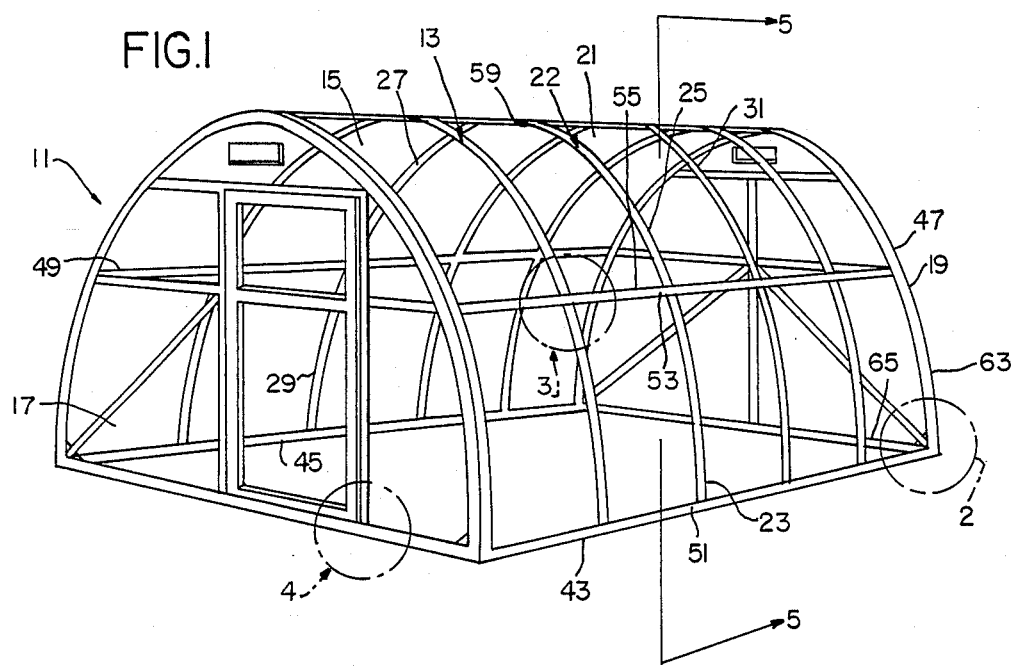
FIG. 1 of the drawings is a perspective view of a greenhouse in accordance with this invention.

FIG. 1 of the drawings illustrates the greenhouse 11 in accordance with this invention. The greenhouse is formed of a skeletal structure generally designated as 13 to be further described below. The skeletal structure 13 is covered a flexible or semi-rigid covering material 15 which is preferably a fiberglass reenforced polyester.

It is seen that the greenhouse comprises an entrance section 17 and an end section 19. Between sections 17 and 19 is a longitudinal area 21. Within the longitudinal area 21, the skeletal structure 13 is formed of a plurality of structural components. These components comprise arches 22 formed of four joined arc elements 23, 25, 27 and 29. Arch 22 is interconnected with other vertically disposed arches such as adjacent arch 31 by horizontally disclosed straight elements such as 33.

Figure 6:
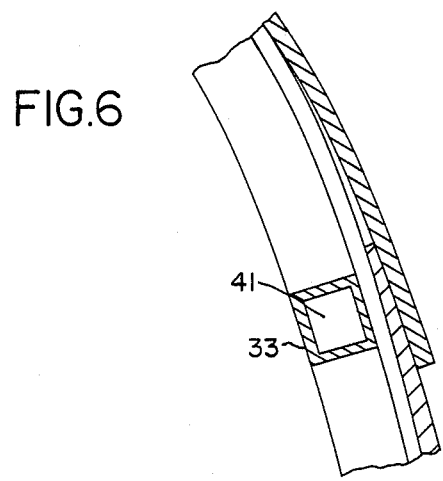
FIG. 6 of the drawings is a closeup section within the circle 6 of FIG. 5 of the drawings.

Each of these structural elements, both arc and horizontally disposed straight, are formed of hollow tubular material which may be best illustrated in FIG. 6 wherein horizontally disposed straight section 33 is shown in cross section illustrating the hollow 41 thereof. The hollow thereof forms the basis for interconnecting all elements utilized within the skeletal structure of the greenhouse of this invention.

Figure 2:
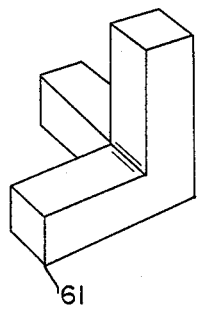
FIG. 2 of the drawings is a closeup view of the interconnection within the circle 2 of FIG. 1.
Figure 3:
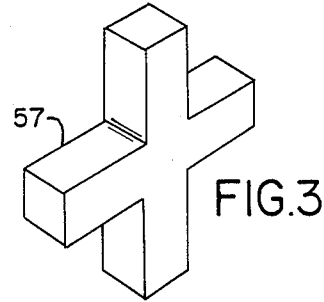
FIG. 3 of the drawings is a closeup view of an interconnection within the circle 3 of FIG. 1 of the drawings.
Figure 4:
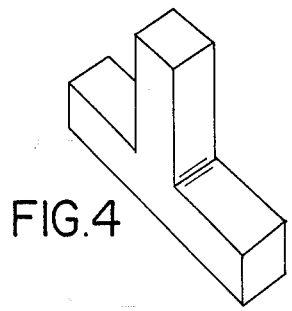
FIG. 4 of the drawings is a closeup view of the interconnection within the circle 4 of FIG. 1 of the drawings.

FIGS. 2, 3 and 4 illustrate the interconnection which are to be described.

For purposes of description, it should be noted that horizontally disposed straight sections form three distinct components, ground sections 43 and 45, intermediate sections 47 and 49, and gable element 59.

Referring to arch 22 and the first arc thereof 23 interconnected to ground section 43 at 51. The first interconnection at 51 is generally illustrated in FIG. 4 as an inverted "T" 52 formed to provide for three connections. A similar interconnection connects arc 29 to ground section 45.

Arc 23, proceeding upwardly, is interconnected at 53 to arc 25 and horizontal section 33 and 55 by a cruciform interconnection 57 generally illustrated in FIG. 3 of the drawings.

A similar interconnection exists between arc 25, 27 and gable element 59.

A third interconnection 61 is illustrated in FIG. 2 of the drawings which illustrates the corner that occurs between rear arch 63, ground arch 43, and ground end arch 65.

Figure 5:
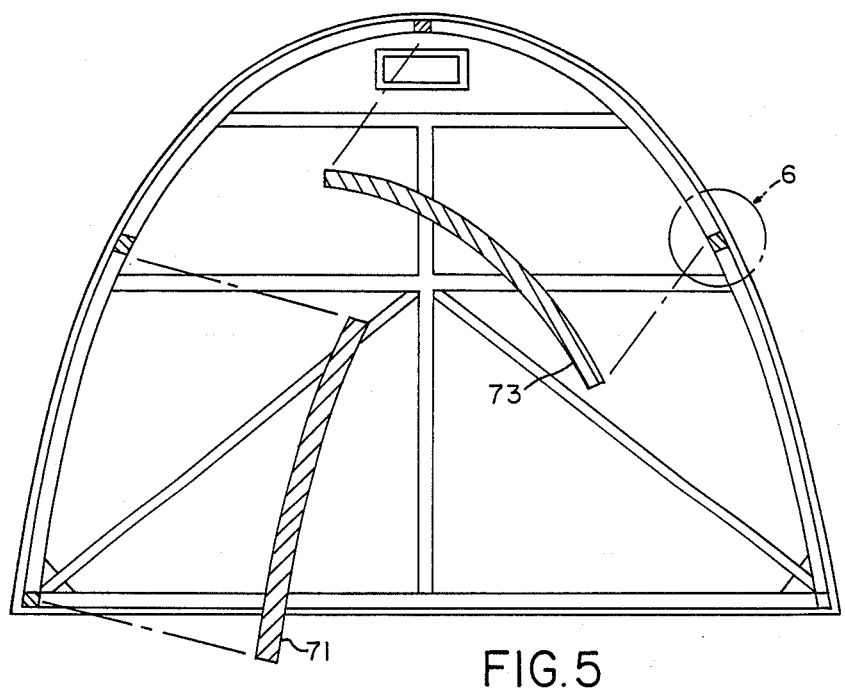
FIG. 5 of the drawings is a view along the line 5—5 of FIG. 1 illustrating insulated panel placement.

A novel and highly advantageous feature of this invention is illustrated in FIG. 5 of the drawings wherein insulated panels 71 and 73 are illustrated. It should be noted that horizontally disposed elements and arc elements occur at uniform lengths such that adjacent arch elements and horizontally disposed elements, together with covering 15 define a receptacle into which insulated panels, e.g., 71 or 73, may be snug fit and removed when desired. The use of interchangeable and removaable insulating panels makes it possible to control exposure to to sunlight during the daylight hours and during the night hours permit installation of such panels to retain heat gained during the daylight hours. Such insulated panels are preferably formed of conventional polystyrene cut to the desired dimensions for a snug force fit.

From a reading of the above description and a view of FIG. 1, it is seen that with very few components a greenhouse structure of virtually any length may be assembled with similar entrance sections and end sections utilized regardless of the length of the entire structure. Additionally, while the term greenhouse has been used throughout this specification, it is understood that this invention is not limited to greenhouses, but is directed to structures in general of the type described. For example, the structure of this invention may be utilized for auxiliary storage, swimming pool covers, etc.

It is thus seen that the structure of this invention provides simplicity, control of solar exposure, control of insulation, and economy not heretofore available in the prior art. As many variations will become apparent to those of skill in the art from a reading of the above description, such variations are included within the spirit and scope of the invention as defined by the following claims.

What is claimed is:

1. A building structure comprising:
   a plurality of structural components defining a skeletal structure;
   a flexible covering over the exterior of said skeletal structure;
   said structural components defining with said flexible covering a receptacle; and
   a plurality of insulating panels selectively and removably stationed within some of said receptacles.

2. The structure according to claim 1 wherein said structural components comprise:
   a plurality of vertically disposed arches, each of said arches being formed of four joined arc elements; and
   a plurality of horizontally disposed straight elements joined to and interconnecting said arches.

3. The structure according to claim 2 wherein said arc elements and said straight elements are formed of hollow tubular material; and further comprising connecting elements interfitting with said hollow tubular material in the hollow thereof.

4. The structure according to claim 2 wherein said horizontally disposed straight elements are interconnected to form ground sections, intermediate sections, and a gable section and wherein one of said arches has a first of said arc elements interconnected to one of said ground sections between horizontally disposed straight elements thereof at a first interconnection, a second of said arc elements is interconnected with said first arc element and one of said intermediate sections between two said straight elements thereof at a second interconnection, a third of said arc elements is interconnected to said second arc element and said gable section between horizontally disposed elements at a third interconnection and a fourth of said arc elements interconnected to the other of said intermediate sections between horizontally disposed straight elements thereof and said third arc element at a fourth interconnection and to the other of said ground sections between horizontally disposed straight sections thereof at a fifth interconnection.

5. The structure according to claim 4 wherein said arc elements and said horizontally disposed elements are formed of hollow tubular material and said interconnections interfit with said hollow tubular material in the hollow thereof and wherein said first and fifth interconnections are inverted "T" shaped for three connections; said second, third and fourth interconnection are cruciform for four connections.

6. The structure according to claim 2 wherein one of said arches is an entrance arch and another of said arches is an end arch and wherein two ends of said entrance and end arches are joined to one another by respectively a ground entrance section and a ground end section each of which are perpendicular to other ground sections.

7. The structure according to claim 6 wherein said ground entrance section and ground end section are formed of said horizontally disposed straight elements, said horizontally disposed elements and said arc elements being formed of hollow tubular material and further comprising connecting elements interfitting with said hollow tubular material in the hollow thereof and wherein said ground entrance section and said ground end section are connected their respective said arches by said connecting elements to form a sixth interconnection, said sixth interconnection being tri-leggd with each leg thereof being disposed at an angle of 90 degrees from other legs thereof to form three connections.

* * * * *